United States Patent Office 2,963,765
Patented Dec. 13, 1960

2,963,765
METHOD OF CURING CONCRETE

Richard M. Tillman, Ponca City, Okla., assignor to Continental Oil Company, Ponca City, Okla., a corporation of Delaware No Drawing. Filed Oct. 25, 1957, Ser. No. 692,262

5 Claims. (Cl. 25—154)

This invention relates to a method of retarding the evaporation of water from concrete during the curing period in order to insure thorough hydration of the cement and thereby produce a concrete of maximum strength.

As is well known, water must be retained in new concrete for a sufficient length of time to permit the concrete to cure. Curing means retention of the mixing water until hydration or the chemical reaction of the cement, sand, and water is completed. After concrete is placed and finished by trowelling, screeding or belting, evaporation of the mixing water must be prevented until hydration of the cement is completed. This is universally recognized as essential to the production of durable concrete. Various methods have been used heretofore to retain water in newly layed concrete for a sufficient period of time to effect curing. One method is that of surrounding the new concrete with embankments which confine quantities of water poured over the concrete. This method is known as ponding and is impractical for long stretches of roadway and shorter stretches on grades, as well as being expensive. In another method, as soon as the concrete can sustain considerable weight the surface is covered with several inches of earth which must be kept wet and, of course, after the cement has cured the earth must be removed from the roadway before the same can be opened to traffic. Other methods make use of various coverings such as straw, hay, burlap, canvas, etc., which can be kept wet and which retard evaporation from the concrete as well as protect the concrete from the direct rays of the sun. As is apparent, such coatings must be removed before the roadway can be used. In another method, the concrete is coated with an impervious hydrocarbon film such as asphalt or paraffin diluted with a volatile hydrocarbon solvent. The asphalt has very good water retention properties but cannot be used in many applications such as buildings, bridges, etc., due to its unsightly color. Furthermore, the dark color of the asphalt renders its use undesirable in hot climates, since it causes heat to be absorbed from the sun, thus allowing the concrete to cure at too high a temperature. Paraffin coatings, while not objectionable from a color standpoint, melt or crack and peel readily and, in addition, generally do not have satisfactory water retaining properties. In water retention properties, paraffin coatings are much inferior to the asphalt coatings.

It is therefore a principal object of the present invention to provide a method which obviates the disadvantages of the prior art methods. Another object of this invention is to provide a coating composition for concrete which aids in the curing of the concrete. These and other objects and advantages will become apparent as the invention is more thoroughly described.

The foregoing objects and advantages are attained by a process which, in brief, may be described as follows. The surface of the concrete is coated with a composition comprising a volatile petroleum hydrocarbon solvent, a microcrystalline wax as a primary film forming substance, an additive capable of modifying the nature of the microcrystalline wax film deposited on evaporation of the solvent, and an organic dye. Somewhat more specifically, the additive is a crystalline structure modifier for the wax and as such it decreases the extent of intergranular boundaries in the wax film to the point that the film appears homogeneous under moderate (100×) magnification. As a secondary function the additive acts as a dispersing agent which prevents the settling out of the microcrystalline wax in the light petroleum solvent.

Before proceeding with specific examples illustrating my invention, it may be well to indicate in general the types of compounds which may be used in the process.

As used herein and in the appended claims, the term "microcrystalline wax" is a residual product of a high molecular weight petroleum hydrocarbon. The structure of microcrystalline wax as it is commonly understood includes a large proportion of branched chain and naphthenic materials, as well as straight chain hydrocarbons. Microcrystalline wax is characterized by being less crystalline than paraffin wax and is further characterized by its ability to occlude oil. As to its physical properties, it is flexible and ductile. Microcrystalline wax is not a chemically pure compound, as the term is generally understood in chemical technology, but is a mixture of compounds and for that reason it does not have any clearly defined melting point. In general, these waxes melt over a range varying from about 125 to 200° F.

Suitable petroleum hydrocarbon solvents are those having boiling points within the range of about 200 to 400° F. Solvents are selected having boiling points within this range for two reasons. First, because of safety. If the boiling point is lower than 200° F. the fire hazard would be great. Secondly, the boiling point should not exceed a certain value because it is desired that after application of the mixture to the surface of the concrete the solvent will evaporate leaving a film of wax and the other components of the mixture on the concrete. Either pure hydrocarbons having a boiling point within this range or mixtures of hydrocarbons may be used. For economical reasons I prefer to employ mixtures of hydrocarbons.

As to the organic dye used, it should be one which is classified as "light fugative." The only purpose of the dye is to define the area of application of the curing agent to the freshly poured concrete. Obviously, after the concrete has been coated with the curing agent, fading of dye as the result of exposure to light is immaterial and is indeed to be preferred.

As pointed out above, the function of the additive is its property as a crystalline structure modifier and as a dispersing agent. In this dual role it prevents the settling out of microcrystalline wax in the light petroleum solvent and also insures a more uniform coating after the evaporation of the solvent. Suitable additives include hydrogenated tallow amine, a fatty amine from soya oil, and a high pressure process polyethylene having a molecular weight within the range of 1,500 to 2,000.

As to the amount of each component used in my cement curing composition, that may be varied rather widely. Suitable quantities on a weight basis vary from 1 to 40 percent microcrystalline wax, 45 to 98 percent solvent, 0.005 to 5 percent of the organic dye, and 0.025 to 10 percent of the dispersing agent. Preferred quantities, again on a weight basis, vary from 20 to 25 percent wax, 60 to 80 percent solvent, organic dye 0.005 to 0.05 percent, and 0.025 to 2.0 percent dispersing agent.

In order to disclose the nature of the present invention still more clearly the following illustrative examples will be given. It is to be understood, however, that the invention is not to be limited to the specific conditions or details set forth in these examples except in so far as such limitations are specified in the appended claims. Parts given are parts by weight.

Example 1

A cement curing composition prepared in accordance to this example and my invention contained the following components:

44 parts microcrystalline wax
2 parts Armeen 2HT fatty amine
154 parts wash naphtha
.012 part National Oil Red-O dye Armeen 2HT fatty amine is the trade name of an N-secondary amine prepared from hydrogenated tallow having the following distribution of normal alkyl radicals:

24% hexadecyl
75% octadecyl
1% octadecenyl

Other properties are as follows:

Approximate molecular combining weight____ 530.
Apparent secondary amine_____ 87% min.
Approximate melting point_____ 68° C.

Wash naphtha is a hydrocarbon having the following physical properties:

Typical distillation data:
```
    IBP  _____ °F__ 284
    50%  _____ °F__ 318
    90%  _____ °F__ 345
    100% _____ °F__ 388
API gravity_____ 50.6
```

Example 2

In this example a cement curing composition was prepared containing the following components:

44 parts microcrystalline wax
1 part Armeen S fatty amine
155 parts wash naphtha
.012 part National Oil Red-O dye Armeen S fatty amine is an N-primary amine prepared from soya oil having the following distribution of normal alkyl radicals:

20% hexadecyl
17% octadecyl
26% octadecenyl
37% octadecadienyl

Other properties are as follows:

Mean molecular weight of primary amine content___ 264
Molecular combining weight_____ 297
Approximate melting point_____°C__ 31

Example 3

In this example a cement curing composition was prepared containing the following components:

43.5 parts microcrystalline wax
0.5 part Semet Solvay #617 polyethylene
156 parts wash naphtha
.012 part National Oil Red-O dye The product Semet Solvay #617 polyethylene is the trade name of a polyethylene prepared under high pressure and it had a molecular weight of approximately 1,500. The wash naphtha used in Examples 1, 2, and 3 was a product having a boiling range from 284 to 388° F.

The products prepared in accordance to Examples 1, 2, and 3 were tested for water retention following the procedure as described in ASTM Specification C–156–55, ASTM Standards, 1955, part 3, American Society for Testing Materials, Philadelphia, Pennsylvania.

The formulations of Examples 1, 2, and 3 gave water retention of 97.2 percent, 96.2 percent, and 96.6 percent, respectively, when run in accordance with ASTM Specification C–156. For comparison purposes commercial products known as Hunt Process Clear and Sealtight gave water retention of 92.0 percent and 88.9 percent, respectively, under the same test procedure.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The process of curing concrete which comprises applying to a concrete as a surface coating before the concrete has set a composition comprising on a weight basis a volatile petroleum hydrocarbon solvent, 45 to 98 percent; a microcrystalline wax, 1 to 40 percent, as a film forming substance; an organic dye, 0.005 to 5 percent; and a dispersing agent, 0.025 to 10 percent; wherein said dispersing agent is selected from the group consisting of hydrogenated tallow amine, a fatty amine from soya oil, and a polyethylene having a molecular weight within the range of 1500 to 2000, characterized further in that said coating has a water retention value of at least 96 percent as determined by ASTM Specification C–156–55, ASTM Standards, 1955, part 3.

2. The process of curing concrete which comprises applying to a concrete as a surface coating before the concrete has set a composition comprising on a weight basis a volatile petroleum hydrocarbon solvent, 60 to 80 percent; a microscrystalline wax, 20 to 25 percent, as a film forming substance; an organic dye, 0.005 to 0.05 percent; and a dispersing agent, 0.025 to 2.0 percent; wherein said dispersing agent is selected from the group consisting of hydrogenated tallow amine, a fatty amine from soya oil, and a polyethylene having a molecular weight within the range of 1500 to 2000, characterized further in that said coating has a water retention value of at least 96 percent as determined by ASTM Specification C–156–55, ASTM Standards, 1955, part 3.

3. The process of claim 1 wherein the dispersing agent is a hydrogenated, tallow amine.

4. The process of claim 1 wherein the dispersing agent is a fatty amine from soya oil.

5. The process of claim 1 wherein the dispersing agent is a high pressure process polyethylene having a molecular weight of about 1500.

References Cited in the file of this patent

UNITED STATES PATENTS

| | | |
|---|---|---|
| 1,867,421 | Rowan et al. | July 12, 1932 |
| 1,942,000 | Reynolds | June 2, 1934 |
| 2,143,515 | Hayden | Jan. 10, 1939 |
| 2,275,272 | Scripture | Mar. 3, 1942 |
| 2,839,811 | Benedict | June 24, 1958 |

OTHER REFERENCES

The Chemistry and Technology of Waxes, Warth, 2nd Edition, Reinhold Publishing Corp. (1956), pages 429, 430, 434, 435, 445 and 516.